May 8, 1956  J. K. MERTZWEILER ET AL  2,744,921
DECOBALTING IN OXO PROCESS USING OXIDIZING GAS AND ORGANIC ACID
Filed Feb. 9, 1952
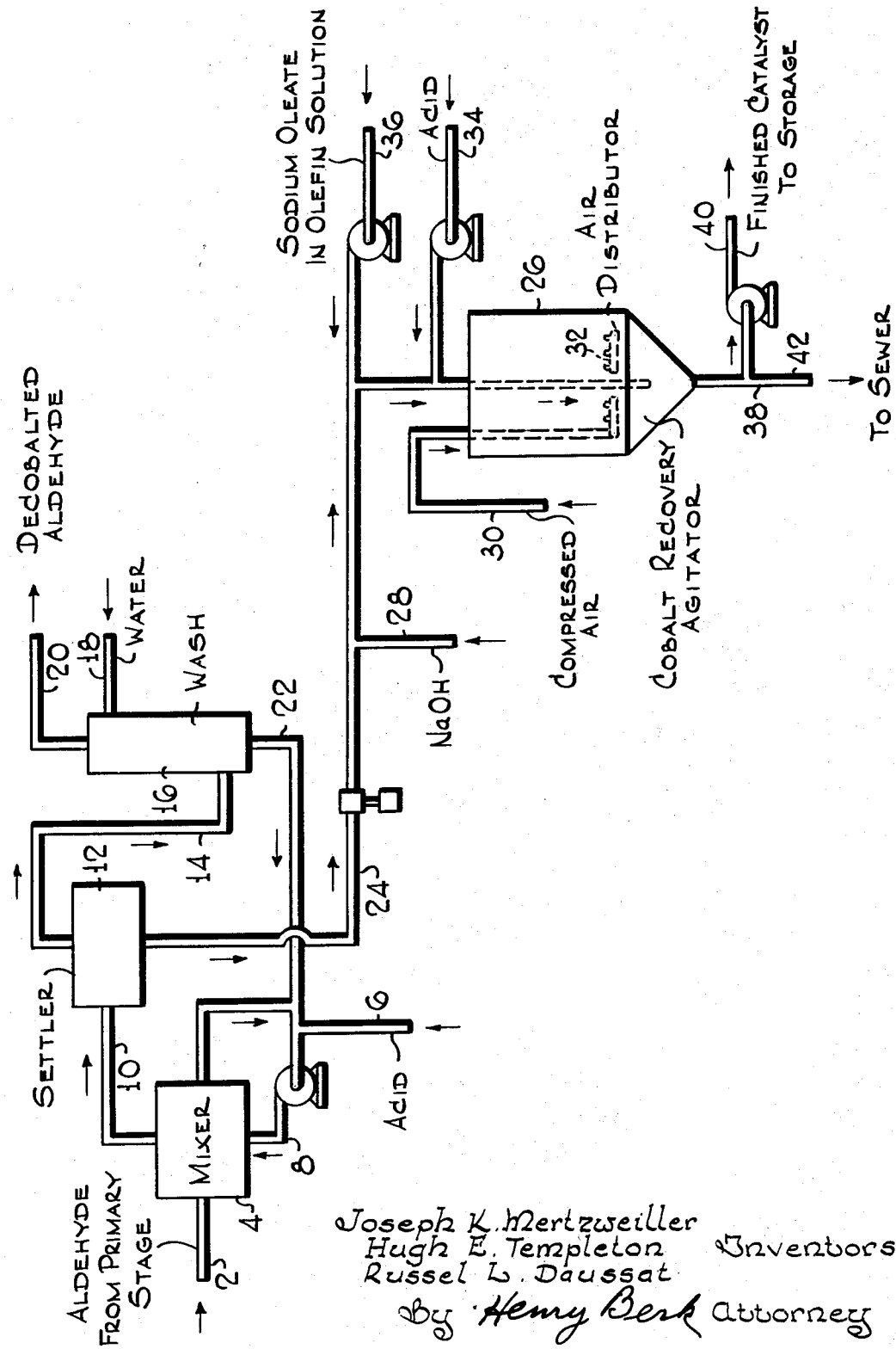
Joseph K. Mertzweiler
Hugh E. Templeton    Inventors
Russel L. Daussat
By Henry Berk Attorney United States Patent Office 2,744,921
Patented May 8, 1956

2,744,921

DECOBALTING IN OXO PROCESS USING OXIDIZING GAS AND ORGANIC ACID

Joseph K. Mertzweiller, Hugh E. Templeton, and Russell L. Daussat, Baton Rouge, La., assignors to Esso Research and Engineering Company, a corporation of Delaware Application February 9, 1952, Serial No. 270,837

11 Claims. (Cl. 260—414)

The present invention relates to the preparation of organic compounds by the reaction of carbon monoxide and hydrogen with carbon compounds containing olefinic linkages in the presence of carbonylation catalyst. More specifically, the present invention relates to the recovery of the cobalt catalyst utilized in the foregoing reaction from the product of the first stage of cobalt carbonylation reaction for further use in the process.

It is now well known in the art that oxygenated organic compounds may be synthesised from organic compounds containing olefinic linkages by a reaction with carbon monoxide and hydrogen in the presence of a catalyst containing metals of the iron group, such as cobalt or iron, preferably the former, in an essentially three-stage process. In the first stage, the olefinic material, catalyst and the proper proportions of CO and $H_2$ are reacted to give a product consisting predominantly of aldehydes containing one more carbon atom than the reacted olefin. This oxygenated organic mixture, which contains dissolved in it salts and the carbonyls and molecular complexes of the metal catalyst, is treated in a second stage to cause removal of soluble metal compounds from the organic material in a catalyst removal zone. The catalyst-free material is then generally hydrogenated to the corresponding alcohols, or may be oxidized to the corresponding acid.

This carbonylation reaction provides a particularly attractive method for preparing valuable primary alcohols which find large markets, particularly as intermediates for plasticizers, detergents and solvents. Amenable to the reaction are long and short chained olefinic compounds, depending upon the type alcohols desired. Not only olefins, but most organic compounds possessing at least one non-aromatic carbon-carbon double bond may be reacted by this method. Thus, straight and branch-chained olefins and diolefins such as propylene, butylene, pentene, hexene, heptene, butadiene, pentadiene, styrene, olefin polymers such as di- and tri-isobutylene and hexene and heptene dimers, polypropylene, olefinic fractions from the hydrocarbon synthesis process, thermal or catalytic cracking operations, and other sources of hydrocarbon fractions containing olefins may be used as starting material, depending upon the nature of the final product desired.

The catalyst in the first stage of the prior art processes is usually added in the form of salts of the catalytically active metal with high molecular fatty acids, such as stearic, oleic, palmitic, naphthenic, etc., acids. Thus, suitable catalysts are, for example, cobalt oleate or naphthenate. These salts are soluble in the liquid olefin feed and may be supplied to the first stage as hydrocarbon solution or dissolved in the olefin feed.

The synthetic gas mixture fed to the first stage may consist of any ratio of $H_2$ to CO, but preferably these gases are present in about equal volumes. The conditions for reacting olefins with $H_2$ and CO vary somewhat in accordance with the nature of the olefin feed, but the reaction is generally conducted at pressures in the range of about 1500 to 4500 p. s. i. g. and at temperatures in the range of about 150°–450° F. The ratio of synthesis gas to olefin feed may vary widely; in general, about 2500 to 15,000 cubic feet of $H_2+CO$ per barrel of olefin feed are employed.

At the end of the first stage, when the desired conversion of olefins to oxygenated compounds has been effected, the product and the unreacted material are generally withdrawn to a catalyst removal zone, where dissolved catalyst is removed from the mixture and it is to this stage that the present principal invention applies.

From the catalyst removal zone the reaction products, comprising essentially aldehydes, may be transferred to a hydrogenation zone, and the products reduced to the corresponding alcohols in a manner known per se.

One of the problems involved in the aldehyde synthesis reaction is the fact that the catalyst metal, such as cobalt, though added as an organic salt, reacts with carbon monoxide under the synthesis conditions to form the metal carbonyl. There is basis for the belief that the metal carbonyl itself is the active form of the catalyst. This dissolved catalyst must be removed prior to the subsequent hydrogenation, as otherwise it would separate out on the hydrogenation catalyst, plug transfer lines and heat exchangers, etc. The carbonyl remains dissolved in the reaction product from the primary carbonylation stage and is therefore removed in the catalyst removal, or decobalting zone. A way to remove the cobalt is by a thermal method wherein the aldehyde product containing the dissolved cobalt is heated to a temperature of from 300–400° F. preferably in the presence of an inert gas, a steam coil being immersed in the liquid. This process has the marked disadvantage in that not only is decobalting incomplete, because aldehyde-soluble cobalt compounds that are not carbonyls are not decomposed by this method, but also the cobalt metal that results from the thermal decomposition deposits as hard crusts on the heat transfer surfaces, and is difficult to remove and recover, and frequent shut downs and turnarounds are necessary.

These difficulties were to a great extent removed, and a long step forward taken, when it was found that when the cobalt-contaminated aldehyde product comprising the first stage reactor effluent was treated with dilute aqueous solutions of organic acids whose cobalt salts are water soluble and oil-insoluble, exceptionally efficient decobalting was obtained with residual cobalt content of the aldehyde product less than ten parts per million. The thermal decobalting process frequently left a feed for the subsequent hydrogenation process containing from 100–500 parts per million of dissolved cobalt. This resulted from the fact, as indicated above, that although the cobalt carbonyls are readily decomposed at the thermal conditions, the other oil-soluble compounds of cobalt found in the aldehyde product, such as cobalt soaps and salts originating from secondary reactions in the aldehyde synthesis stage, are quite stable at these temperatures.

An important advantage of acid decobalting, besides the fact that lower temperatures are required than in thermal decobalting, is that cobalt recovery is considerably simplified and made more nearly quantitative. Because of the strategic importance of this metal, it is essential for an economically feasible process that substantially all the metal be recovered and reutilized. Thus, instead of precipitating the metal as a solid on packing tubes, reactor walls or heat transfer surfaces, as in prior art practices, the effect of dilute aqueous organic acid injection is to convert substantially all the cobalt dissolved in the aldehyde product, regardless of what form it is present, into a water-soluble salt, and this aqueous stream is readily separated from the decobalted aldehyde product.

The utilization of this aqueous cobalt stream, however which may have a cobalt concentration of from 0.1 to 10%, poses several real problems. The most obvious and direct method of utilization consists of recycling directly the aqueous stream to the aldehyde synthesis reactor. This step, however, may be quite undesirable in that it introduces considerable quantities of water into the reactor oven, and results in flooding and quenching of the reactor. Under certain circumstances, a limited amount of water in the primary reactor may be beneficial, but under other circumstances, particularly when the cobalt concentration of the recovered aqueous stream is dilute, i. e., about 0.1 to 3% cobalt, flooding is very likely to occur if it is attempted to recycle enough to provide adequate catalyst concentration in the reactor oven corresponding to 0.1 to 0.5% cobalt on olefin. Furthermore, the addition of water is conducive to secondary reaction product formation, particularly fatty acids instead of the desired aldehydes.

As an alternate process, the aqueous cobalt solution may be converted, prior to recycling to the reaction, into an oil-soluble cobalt form similar to the form in which it is initially introduced, i. e., the oil-soluble, high molecular weight fatty acid salt of cobalt, such as cobalt oleate, naphthenate, and the like. This avoids the necessity of recycling large amounts of water. However, when it was attempted to convert the water-soluble cobalt salt, which was assumed to be cobalt acetate (when acetic acid is the decobalting agent) into the corresponding cobalt oleate by heating in the presence of oleic acid and sodium hydroxide, a surprising result was obtained. It was found that only a portion of the cobalt in the aqueous solution was converted into cobalt oleate, in accordance with the reaction $$2RCOOH + 2NaOH + Co^{++} \rightarrow$$
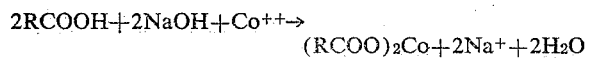
$$(RCOO)_2Co + 2Na^+ + 2H_2O$$

On analysis of the reaction products, after the cobalt oleate formed above had been removed, it was found that a substantial portion of cobalt was still in the water layer.

It is evident, therefore, that a significant portion of the cobalt present in the water solution resulting from acid decobalting is not in a form available for reaction with an organic acid or an alkali, and hence cannot be converted by conventional processes into oil-soluble cobalt soaps.

It is, therefore, an object of this invention to provide an improved means for removing and recovering cobalt catalyst from conversion products resulting from the reaction of olefins, CO and $H_2$, and efficiently reutilizing the recovered catalyst in the reaction.

It is also a purpose of the invention to set forth a process of converting substantially completely the water-soluble cobalt recovered from a dilute acid decobalting process into an oil-soluble salt, and recycling the latter to the aldehyde synthesis reaction zone.

Other and further purposes, objects, and advantages of the present invention will become apparent from the more detailed description hereafter.

The surprising fact has now been found that the acid treatment of the aldehyde does not convert the cobalt carbonyl dissolved therein completely, or even substantially, into cobalt acetate under the reaction conditions, which comprise temperatures no higher than 200° F. to prevent decomposition of the carbonyl into metallic cobalt. Instead of the expected hydrolytic reaction of cobalt carbonyl and other cobalt compounds with the hot dilute acetic acid to form cobalt acetate, it has now been discovered that a substantial proportion of the cobalt in the water layer is present as the anion rather than as the cobaltous cation. Careful analysis of the water layer has now shown that 30–50% of the total cobalt is present as cobalt anion $Co(CO)_4^-$, and the corresponding cobalt salt, $Co(Co(CO)_4)_2$. From this it is readily seen that when this aqueous solution is treated with oleic acid and caustic to convert the "cobalt acetate" to cobalt oleate, the cobalt in the form of the anion $Co(CO)_4^-$ is not available for conversion to the fatty acid salt. It is probable that the cobalt salt, $Co(Co(CO)_4)_2$, is formed by extraction of aldehyde containing free cobalt hydrocarbonyl, $HCo(CO)_4$, with aqueous solution of cobalt acetate initially formed.

It has further been found that when these aqueous solutions of cobalt wherein that element is present as part of the anion $Co(CO)_4^-$ are treated with an oxidizing agent, such as air, in an alkaline medium, the cobalt present originally as the anion is converted to insoluble compounds, which upon acidification of the solution are converted to the cobaltous ion. In addition the cobaltous ion ($Co^{++}$) originally present in the solution is precipitated as cobaltous hydroxide, a compound not appreciably affected by the oxidation treatment, the cobaltous hydroxide then being reconverted to cobaltous ion in the subsequent acidification. The overall effect is to convert the major portion of the cobalt originally present in the aqueous decobalter solution, i. e., $Co^{++}$ and $Co(CO)_4^-$, to the cobaltous ion form, which is then readily converted to fatty acid salts, such as the oleate or naphthenate. Thus the acidified cobalt material may be treated at elevated temperatures with olefin to be converted, containing in solution oleic acid, thereafter adding aqueous caustic, heating and, after settling, withdrawing the sodium acetate-containing aqueous layer. Also, acidification of the precipitated cobalt may be effected directly with the oleic acid.

The present invention will best be understood from the more detailed description hereafter, wherein reference will be made to the accompanying drawing, which is a schematic representation of a system suitable for carrying out a preferred embodiment of the invention.

Turning now to the drawing, there is depicted merely the decobalting system as well as the conversion system of the invention. The aldehyde synthesis stage is well known at this stage in the art, and is conventional, being operated at about 2000–4500 p. s. i. g. and at temperatures of from about 250–400° F., an olefinic compound, about equivalent quantities of $H_2$ and CO, and some form of cobalt, preferably oil-soluble, being fed to the primary stage.

A stream of primary stage aldehyde product containing dissolved therein relatively large amounts of cobalt carbonyl and other forms of cobalt, to the extent of about 2000 parts per million and more, is passed through line 2 to mixer 4. This unit is of any conventional design, and is adapted to mix thoroughly an aqueous and a water-insoluble liquid organic phase. An aqueous organic acid solution whose cobalt salts are water soluble is injected through lines 6 and 8 into the mixer. Suitable acids are acetic, formic, propionic, and the like. Acetic acid is particularly suitable, for its cobalt salts have a relatively greater water solubility than, for instance, those of formic acid, and so less water is required for their complete recovery. Acid is added in amounts sufficient at least to combine with all cobalt present, and the water dilution is adequate at least to dissolve all water-soluble cobalt salts and complexes formed. Thus, a satisfactory operation may be had employing about 5–20% by volume of a 5% aqueous solution of acetic acid. For less water soluble cobalt salts, a greater amount of water is required.

The temperature in mixer 4 must not exceed about 200° F., and is preferably about 150–185° F., to prevent thermal instead of chemical decomposition of cobalt carbonyl into the metal.

After sufficient mixing and recirculation, on the order of 30–120 minutes, the mixture is pumped through line 10 to settler 12, where the aqueous and aldehyde layers are allowed to stratify. Substantially all of the cobalt is in the lower aqueous layer. The aldehyde layer may then be passed to water washing equipment 16 via line 14, where hot water at about 165° F. may be injected through line 18 to wash out the last traces of cobalt. The wash water may, in part, be cycled to mixer 2 through line 22 as a diluent for the acid stream.

Overhead from washing equipment 16 there is withdrawn through line 20 substantially completely decobalted aldehyde product, which is then passed to the hydrogenation stage for conversion to alcohol in a manner known per se. The lower aqueous layer, containing in solution the cationic and anionic forms of cobalt, as well as some free acetic acid, is withdrawn through line 24 and is pumped to agitator 26, previously having been admixed with an aqueous caustic solution of about 10% concentration introduced through line 28. The proportion of caustic is such as to maintain in the reactor a pH of about 7–11.5. The reactor is also preferably provided with an efficient mechanical mixer and equipped with a pH recorder-control apparatus (both not shown). Air is then passed through the solution for about 0.5–5 hours through line 30 and perforated distributor 32. Temperature within the reactor is maintained at about 50–200° F., and essentially all of the cobalt present originally in solution is precipitated, and maintained in suspension during agitation.

Thereafter, the mixture is acidified by any suitable acid, such as $H_2SO_4$, etc. whereby substantially all of the precipitate is redissolved. Thereafter, in the same, or another reactor, the cobaltous salt dissolved in water is reacted with a stoichiometric amount of sodium oleate, preferably dissolved in the olefin which is to be converted to aldehyde and alcohol. At a temperature of 50 to 150° F., the cobaltous salt is converted to the cobalt oil-soluble soap, which may then be withdrawn through lines 38 and 40 and passed to storage or to the aldehyde synthesis reactor.

The invention may be further illustrated by the following examples:

Example I

This example is designed to show the presence of cobalt in anion form in the solutions from decobalting with acetic acid.

10 cc. of "cobalt acetate" solution from acid decobalting in a commercial iso-octyl alcohol plant was introduced under 40 cc. 0.1003 N KOH and well mixed (pH=11.0) with no air agitation. The slurry was filtered and filtrate caught in and mixed with 10 cc. fuming nitric acid and several drops of bromine. The mixture was evaporated to dryness and residue dissolved with concentrated sulfuric acid. Cobalt was determined electrolytically, and 0.0274 gm. Co were deposited.

Total Co in original sol.=0.1044 gm.

$$\therefore \text{``\% as anion''} = \frac{0.0274}{0.1044} \times 100 = 26.3$$

The same solution was analyzed by a more rapid potentiometric titration method and found to contain 30% cobalt as the anion.

Example II

This example illustrates that cobalt is incompletely removed from aqueous solutions from acid decobalting when employing conventional methods of preparing cobalt salts of fatty acids.

A mixture of sodium soaps was prepared by treating the heavy "bottoms" obtained as a by-product in the commercial preparation of iso-octyl alcohol with 15% solid caustic at 500° F., for 6 hours. A weight of 202 grams of the crude soaps was mixed with 1300 ml. of warm water and the pH of the mixture adjusted to about 8 by the addition of 50% sulfuric acid. This mixture was then agitated for 15 minutes with 50 ml. of a $C_7$ polypropylene fraction and 700 ml. of a cobalt solution obtained by decobalting iso-octyl aldehyde with an aqueous solution of acetic acid. The cobalt solution contained 1.73 wt. percent cobalt, of which 0.81% (47% of the total) was present in the form of the anion. Under these conditions the soap was present in considerable stoichiometric excess. The mixture was separated into organic and aqueous layers, the former having a cobalt content 3.27 wt. percent and representing 49% of the cobalt originally added. The aqueous layer was analyzed by potentiometric titration and found to contain 0.41 wt. percent cobalt of which 0.36% (or 88% of the total cobalt) was present as the anion. Within the accuracy of the analysis, the recovery of cobalt in the form of the anion in the water layer was 100% of that added as the anion.

Example III

To illustrate the substantially complete conversion of anionic and cationic forms of cobalt in the acid decobalter water layer into cobaltous ion, the following example is given:

10 cc. of cobalt acetate solution containing 0.65% cobalt as cobaltous ion, 0.28% cobalt as the carbonyl anion and a few tenths of a percent of acetic acid were introduced under 40 cc. of 0.1003 N potassium hydroxide. The resulting slurry which had a pH of about 10 was air blown for 40 minutes and then filtered. The alkaline filtrate was found to contain only one milligram of cobalt—or about 1% of the total originally present in the sample.

The precipitate was dissolved in a hot mixture of 8 cc. of concentrated sulphuric acid and 50 cc. of water. The small amount of black precipitate which the sulphuric acid did not dissolve was dissolved in concentrated hydrochloric acid and combined with the sulfuric acid solution.

Ammonium hydroxide was then added to the combined acid filtrate in order to precipitate ferric hydroxide which was removed by filtration. Analysis showed that the iron precipitate contained only 0.1 mg. of cobalt.

After acidification of the ammoniacal filtrate from the iron precipitate analysis, showed that the recovered cobalt therein amounted to 103.4 mg. or 99% of that present in the original sample.

The process of the invention illustrated in the drawing and in the foregoing description admits of numerous modifications. Thus instead of making the recovered decobalter aqueous layer strongly alkaline, oxidizing the salt $Na(Co(CO)_4)$, followed by acidification to convert all the cobalt into cobaltous ion, it may be desirable, in order to avoid handling of precipitated solids and to avoid possible formation of cobaltic compounds, to proceed by a slightly different technique.

Example IV

It has been found that if the cobalt solution is added to an aqueous solution of a fatty acid salt such that the pH of the mixture is in the range of 5–6 and the mixture is oxidized at a temperature preferably in the range of 100–150° F., substantially quantitative recoveries of cobalt may be realized. This technique is illustrated by the following series of examples in which the aqueous cobalt solution (from decobalting with acetic acid) had the following composition:

Total acid wt. percent as HAc____ 1.42.
Cobalt wt. percent as $Co^{++}$_____ 0.92.
Cobalt wt. percent as $Co(CO_4)^-$__ 0.81 (47% of total).

The soaps used in these preparations were obtained by treating oxo (fractionator) bottoms with caustic at 500° F., for 6 hours.

| Run No. | 7 | 8 | 10 | 9 |
|---|---|---|---|---|
| Crude Soaps, Gms. | 202 | 202 | 202 | 129. |
| Acid Decobalter Solution, ml. | 700 | 700 | 500 | 320. |
| Temperature, °F. | 95–105 | 95–105 | 135 | 130–140. |
| Air blown | No | Yes | No | Yes. |
| Solvent | $C_7$ Olefin | $C_7$ Olefin | $C_7$ Olefin | $C_7$ Olefin. |
| Cobalt Conc. in Catalyst Solution, Wt. Percent. | 3.27 | 4.40 | 1.51 | 1.76. |
| Percentage of Cobalt Recovered in Catalyst Solution. | 49 | 65 | 70 | 99. |
| Analysis of aqueous layer: | | | | |
| Total cobalt, wt. percent | 0.41 | 0.31 | | 0.09. |
| Anionic cobalt wt. percent | 0.36 | 0.26 | | 0.09. |
| Percent recovery of anionic cobalt. | 100 | 89 | | 18. |

These data illustrate very clearly the effects of increased temperature and air blowing on the cobalt recovery in the catalyst solution. Run No. 9 which is representative of air blowing at 130–140° F. gave essentially complete recovery of cobalt.

What is claimed is:

1. In a carbonylation process wherein olefinic carbon compounds are contacted in a carbonylation zone with CO and $H_2$ in the presence of a cobalt catalyst under conditions to produce reaction products comprising aldehydes containing at least one more carbon atom than said olefinic compounds, and wherein a solution comprising said reaction products and dissolved cobalt catalyst is transferred to a catalyst removal zone and said cobalt is recovered, an improved method of removing and recovering said cobalt from said aldehyde product which comprises contacting said cobalt-contaminated aldehyde product with an aqueous solution of an organic acid whose cobalt salts are at least partially water soluble and oil insoluble, thereby converting cobalt carbonyls dissolved in said aldehyde into water-soluble forms of cobalt, passing aldehyde product and aqueous solution of cobalt to a settling zone, withdrawing a substantially cobalt-free aldehyde product from said zone, withdrawing from said zone an aqueous solution of cobalt compounds wherein cobalt is present both in an anionic and a cationic form, passing said solution to a mixing zone, increasing the pH of said solution to at least about 7, subjecting said solution to an oxidizing treatment with an oxygen-containing gas to precipitate substantially all of said dissolved cobalt, acidifying said precipitated material comprising cobalt to convert the same substantially into cobaltous ion, and converting cobaltous ion-containing solution thus prepared into cobalt soaps.

2. The process of claim 1 wherein said organic acid is acetic acid.

3. The process of claim 1 wherein aqueous caustic is added to said cobalt-containing aqueous solution and a pH is maintained in said mixing zone in the range of from about 7–11.5.

4. The process of claim 1 wherein said oxidation is carried out by passing air through said solution at a pH of at least about 7.

5. The process of claim 1 wherein said last named cobaltous-ion containing solution is reacted with an alkaline salt of a relatively high molecular weight fatty acid to prepare the corresponding cobalt soap.

6. The process of claim 5 wherein said alkaline salt is dissolved in the olefin to be converted into oxygenated product in said carbonylation zone.

7. In a carbonylation process wherein olefinic carbon compounds are contacted in a carbonylation zone with CO and $H_2$ in the presence of a cobalt catalyst under conditions to produce reaction products comprising aldehydes containing at least one more carbon atom than said olefinic compounds, and wherein a solution comprising said reaction products and dissolved cobalt catalyst is transferred to a catalyst removal zone and said cobalt is recovered, the improvement which comprises contacting said cobalt-contaminated aldehyde product with an aqueous solution of an organic acid whose cobalt salts are at least moderately water soluble and oil insoluble, thereby converting cobalt carbonyls into water-soluble forms of cobalt, withdrawing from said zone an aqueous solution containing anionic and cationic forms of cobalt, subjecting said solution to an oxidation reaction with an oxygen-containing gas in the presence of a compound of an alkali metal selected from the group of alkali hydroxides and alkali salts of fatty acids, and recovering substantially completely said cobalt as a cobalt soap.

8. The process of claim 7 wherein said solution is subjected to said oxidation treatment in the presence of a sodium salt of a relatively high molecular weight fatty acid.

9. The process of claim 7 wherein said oxidation is carried out by air blowing at about 100–150° F.

10. The process of claim 7 wherein said solution is subjected to said oxidation treatment in the presence of caustic, the resulting precipitate acidified, and the solution thus obtained reacted with an alkaline salt of a relatively high molecular weight carboxylic acid.

11. The process of claim 10 wherein said last named acid is oleic acid.

References Cited in the file of this patent

UNITED STATES PATENTS 2,542,747    Barrick _____ Feb. 24, 1951

OTHER REFERENCES

Wender et al.: "Jour. Am. Chem. Soc.," vol. 72 (1950), pp. 4375–4378.

Wender et al.: "Jour. Am. Chem. Soc.," vol. 74 (1952) pp. 1216–1218.

Meyer Translation: "Patent Application of I. G. Farbenindustrie Aktiengesellschaft and Ruhrchemie Aktiengesellschaft," Jan. 26, 1951, chapter 12 and chapter 19, pp. 31, 32, 47 and 49. Translation of TOM Reel 36 Item 21 and part of Item 36, O. Z. 13284 and O. Z. 13599.